United States Patent Office 3,405,145
Patented Oct. 8, 1968

3,405,145
SELECTIVE OXIDATION OF LEUCOANTHRA-
QUINONES COMPRISING A DIHYDROXY-
PHENYL SUBSTITUENT
Marshall R. Brimer and Charles L. Gibson, Kingsport,
Tenn., assignors to Eastman Kodak Company, Rochester, N.Y., a corporation of New Jersey
No Drawing. Filed Aug. 25, 1965, Ser. No. 482,622
3 Claims. (Cl. 260—380)

ABSTRACT OF THE DISCLOSURE

A process for selectively oxidizing the leucoanthraquinone nucleus of a leucoanthraquinone compound containing at least one dihydroxyphenyl group to form the corresponding anthraquinone dye without oxidizing the dihydroxyphenyl group by heating the leucoanthraquinone compound in the presence of a benzoquinone compound and activated carbon under acid conditions.

This invention relates to processes for oxidizing leucoanthraquinone dyes to the corresponding anthraquinone dyes.

In the preparation of anthraquinone dyes, the dye is often first produced in the leuco form and then oxidized to the anthraquinone or, if produced as the anthraquinone, may be purified by reduction followed by oxidation. In the past, the oxidation has been generally carried out by a wide variety of methods, varying from heating in sulfuric acid at high temperatures, with or without other oxidizing agents present, to the relatively mild method of bubbling air through a solution of the leucoanthraquinone. In certain instances, such aerial oxidations, although considered mild, have been found in some instances to oxidize other groups such as dihydroxyphenyl groups present in the dye in addition to the leucoanthraquinone nucleus. The present invention is concerned with providing processes for selectively oxidizing the nucleus.

The processes of the invention include the selective oxidation of leucoanthraquinone by heating the leucoanthraquinone dyes in the presence of activated carbon and o- and p-benzoquinones such as o-benzoquinone, p-benzoquinone, alkylated and halogenated o-benzoquinones and p-benzoquinones, under acid conditions. As a result, substantially better yields of product of higher purity are obtained in less time than when the prior methods of oxidation are used. In carrying out the processes, the amounts of the benzoquinone compound and activated carbon can be varied although some change in quality of product can be expected. As will be seen from the examples below, the amount used of benzoquinone oxidizing agent for the leuco compound need not be equal to the theoretical amount necessary for the dehydrogenation assuming the benzoquinone is completely reduced, e.g., to hydroquinone. In fact, about 20% of the theoretical amount of benzoquinone is very satisfactory. In general, an amount of the benzoquinone can be used to equal to about 5–20% of the weight of the leuco compound. An amount of activated carbon can be used approximately equal to the weight of the leuco compound, some leuco compounds requiring more or less than this amount as can readily be determined by spectral analysis as oxidation proceeds. Strong acids can be used for acidifying the reaction mixture, e.g., hydrochloric and sulfuric acids and, in general, an amount of acid is used at least sufficient to neutralize the alkali used in the synthesis of the leucoanthraquinone compound, i.e., about 10–30% by weight of the aminohydroquinone hydrobromide used in preparing the anthraquinone dye developers described below.

In carrying out the processes, as illustrated by the following examples, the leuco compound is formed in, or dissolved in, an inert organic solvent and the acid, carbon and benzoquinone added thereto, although the order of addition of the reactants can be varied. The mixture is heated until hydrogenation is complete (about one to eight hours) and the product isolated by known methods such as precipitation into water. The temperature of heating can be varied. A temperature of about 100° C. is satisfactory, the reaction proceeds at a lower rate at a temperature much lower than 100° C. and rate of reaction is not greatly increased at higher temperatures. Decomposition and side reactions can be expected with some anthraquinones if too high a temperature is used. It is convenient to carry out the reaction at reflux temperature of an inert solvent such as methyl Cellosolve, dimethyl formamide, dimethyl sulfoxide, pyridine, etc.

The oxidation processes of the present invention have been found especially useful to oxidize leucoanthraquinone dye developers to anthraquinone dye developers. Dye developers may be defined as compounds which are both dyes and developers of exposed silver halide emulsions. They may be further defined as being compounds which contain within the same molecule the chromophoric system of a dye and also a silver halide developing function. A preferred class of anthraquinone dye developers are those which comprise an anthraquinone nucleus which is substituted by radicals which in turn contain silver halide developer radicals, e.g., hydroquinonyl, catechol, etc., radicals. In a preferred embodiment of such compounds the silver halide developing radical is joined to the anthraquinone nucleus through an alkylamino radical. Anthraquinone dye developers are disclosed in the United States Patents 2,983,605 and 3,047,386. The following are examples of oxidized anthraquinone compounds which can be prepared from the corresponding leuco compounds:

1,4-bis(α-methyl-β-hydroquinonyl-ethylamino)-5,8-dihydroxyanthraquinone.
1-(α-hydroxymethyl-propylamino)-4-(α-methyl-β-hydroquinonylethylamino)anthraquinone.
1-(α-hydroxymethyl-propylamino)-4-(α-methyl-β-hydroquinonylethylamino)-5,8-dihydroxyanthraquinone.
1-hydroxy-4-(α-methyl-hydroquinonylethylamino)anthraquinone.
1,4-bis(α-methyl-γ-hydroquinonylpropylamino)anthraquinone.
1,5-bis-hydroquinonylmethylaminoanthraquinone.
1,4-bis-hydroquinonylmethylaminoanthraquinone.
1,4-bis(α-methyl-β-hydroquinonylethylamino)-6,7-dichloroanthraquinone.
1-(α-methyl-β-hydroquinonylethylamino)-4-(α-ethyl-β-hydroquinonylethylamino)anthraquinone.
1-(α-methyl-β-hydroquinonylethylamino)-4-(α-ethyl-β-hydroquinonylethylamino)-5,8-dihydroxyanthraquinone.
1,4-bis(α-methyl-2',5'-dihydroxybenzylamino) anthraquinone.
1,4-bis(α-methyl-β-hydroquinonylethylamino)-5,8-bis-benzene-sulfonamidoanthraquinone.
1,4-bis(α-methyl-β-hydroquinonylethylamino)-5-hydroxy-8-aminoanthraquinone.
1,4-bis(α-methyl-β-hydroquinonylethylamino)-5-hydroxyanthraquinone.
1,4-bis(α-hydroquinonylethylamino)anthraquinone.
1-[p-(β-hydroquinonylethyl)phenylamino]anthraquinone.
1-(α-hydroxymethyl-propylamino)4-[β-(4'-methyl-2',5'-dihydroxyphenyl)-α-methyl-ethylamino]anthraquinone.
1-ethylamino-4-[β-(3',4'-dihydroxyphenyl)-ethylamino]anthraquinone.

1-chloro-4-(β-hydroquinonylethylamino)anthraquinone.
1-hydroxy-4-[β-(3',4'-dihydroxyphenyl)-ethylamino]anthraquinone.
1-chloro-5-(β-hydroquinonylethylamino)anthraquinone.
1,4-bis[β-(3',4'-dihydroxyphenyl)ethylamino]-5,8-dihydroxyanthraquinone.
1,8-bis[β-(3',4'-dihydroxyphenyl)ethylamino]anthraquinone.
1-[β-(3',4'-dihydroxyphenyl)ethylamino]anthraquinone.
1-β-hydroquinonylethylaminoanthraquinone.
1,5-bis[β-(3',4'-dihydroxyphenyl)ethylamino]anthraquinone.
1,5-bis(β-hydroquinonylethylamino)anthraquinone.
1,8-bis(β-hydroquinonylethylamino)anthraquinone.
1,5-bis(α-methyl-β-hydroquinonylethylamino)anthraquinone.
1-(β-hydroxyethylamino)-4-(β-hydroquinonylethylamino)anthraquinone.
1,4-bis[β-(3',4'-dihydroxyphenyl)ethylamino]anthraquinone.
1-(β-hydroxyethylamino)4-(α-methyl-β-hydroquinonylethylamino)-5,8-dihydroxyanthraquinone.
1,4-bis(α-ethyl-β-hydroquinonylethylamino)anthraquinone.
1-methylamino-4-(β-hydroquinonylethylamino)anthraquinone.
1-β-hydroxyethylamino-4-(α-methyl-β-hydroquinonylethylamino)anthraquinone.
1,4-bis(2',5'-dihydroxyanilino)anthraquinone.
N-monobenzoyl-1,4-bis[β-(3',4'-dihydroxyphenyl)ethylamino]anthraquinone.
N-monobenzoyl-1,4-bis[β-(2',5'-dihydroxyphenyl)ethylaminoanthraquinone.
4-[1',5'-bis(2",5"-dihydroxyphenyl)-3'-pentyl]amino-1-hydroxyanthraquinone.
1,4-bis[1',5'-bis(2",5"-dihydroxyphenyl)-3' pentylamino]anthraquinone.

It should be noted that the above-mentioned anthraquinones contain radicals such, for example, as ortho- and para-dihydroxyphenyl radicals which are readily oxidizable and, as is known, are capable of developing silver halide emulsions. In order to preserve the developing ability of such radicals it is important, when preparing the dyed developers from the leucoanthraquinones through oxidation or by purifying them by reduction followed by oxidation, that the oxidation be limited to the leucoanthraquinone nucleous and not oxidize these radicals. The process of the invention effects this selective oxidation.

The following are representative o- and p-benzoquinones particularly capable of selective oxidation of the anthraquinones: o- and p-benzoquinone, halogenated benzoquinones, e.g., 3-chloro-o-benzoquinone, 2-chloro-p-benzoquinone, 2-bromo-p-benzoquinone, 2,5-dichloro-p-benzoquinone, 2,5-dibromo-p-benzoquinone, lower alkylated benzoquinones, e.g., 2-methyl-p-benzoquinone, 3-methyl-o-benzoquinone, and 2-nitro-p-benzoquinone.

The following examples will illustrate our invention.

EXAMPLE 1

To a 500 ml. three-necked flask equipped with a mechanical stirrer were charged 196.8 g. methyl cellosolve, 4.0 g. water, 7.2 g. potassium carbonate, and 13.1 g. leuco-1,4,5,8-tetrahydroxyanthraquinone. Air was excluded from the reaction flask by the use of a nitrogen purge throughout the reaction. The mixture was heated to 85° C. and a solution of 24.8 g. 2-aminopropylhydroquinone hydrobromide in 28.2 g. methyl Cellosolve was added over a 4½ hour period. The mixture was stirred at 80–85° for two hours longer and then heated at reflux for 12 hours. After cooling to room temperature, 5 ml. concentrated hydrochloric acid, 31.2 g. activated carbon (Norit F.Q.P.) and 1.0 g. p-benzoquinone were added. The mixture was refluxed for eight hours, then cooled, filtered and precipitated by the addition of 15 g. hydrochloric acid and 600 g. water. There was obtained 18.0 g. of 1,4-bis(α-methyl-β - hydroquinonylethylamino) - 5,8 - dihydroxyanthraquinone which assayed 97.4% as determined by comparison to the visible spectrum of the compound with that of a reference sample.

EXAMPLE 2

Example 1 was repeated, using the same for all reactants, except that no p-benzoquinone was used. At the end of 11½ hours of refluxing during the dehydrogenation step the reaction was incomplete as evidenced by the fact that the visible spectrum of a sample showed characteristic absorption bands of the leuco dye. An additional 1 ml. hydrochloric acid and 5.0 g. activated carbon were added and refluxing was continued for 2½ hours longer after which time the product was isolated as in Example 1. The product weighed 16.3 g. and assayed 91.8%. The example shows the disadvantage of omitting the p-benzoquinone, i.e., longer time is required to obtain a lower yield compared to the process of Example 1.

EXAMPLE 3

To a one liter flask were charged 367 g. methyl Cellosolve, 8.6 g. water, 15.1 g. potassium carbonate and 26.2 g. leuco-1,4,5,8-tetrahydroxyanthraquinone. Air was excluded from the reaction flask by the use of a nitrogen purge throughout the reaction. The contents of the flask were mechanically stirred and heated to 85° C. A solution of 53.8 g. 2-aminopropylhydroquinone hydrobromide in 57 g. methyl Cellosolve was added over a 3½ hour period. The mixture was heated for an additional two hours at 80–85° C. and then at reflux for 16 hours. After cooling to room temperature, the reaction mixture was divided into two equal parts.

Part 1 p-Benzoquinone (1.0 g.), 5 ml. hydrochloric acid, and 31.2 g. activated carbon (Norit F.Q.P.) were added, and the mixture was stirred and heated to reflux. The dehydrogenation was complete after one hour of refluxing as indicated by the absence of the characteristic leuco absorption bands in the visible spectrum of a sample of the reaction mixture. The mixture was cooled, filtered, and precipitated by the addition of 15 g. hydrochloric acid and 700 ml. water. The product was filtered, washed with water and dried in a vacuum oven at 70° C. to obtain 19.8 g. of 1,4-bis(α-methyl-β-hydroquinonylethylamino) - 5,8-dihydroxyanthraquinone with an assay of 92.6%.

Part 2

Hydrochloric acid (5 ml.) and 31.2 g. activated carbon (Norit F.Q.P.) were added and the mixture was heated to reflux. (After 9½ hours the reaction was still incomplete. Hydrochloric acid (2 ml.) was added and refluxing was continued for four hours longer. The reaction still contained leuco dye. An additional 5 g. of activated carbon was added and refluxing was continued for five hours longer after which time the dehydrogenation was complete. The product which was isolated as in Part 1, weighed 15.1 g. and assayed 87.5%.

The example again shows that both the benzoquinone and activated carbon are essential to obtain high yield in minimum reaction time.

The process of the above examples can be used to oxidize the leuco forms of other anthraquinones such as given above.

The invention has been described in considerable detail with particular reference to certain preferred embodiments thereof, but it will be understood that variations and modifications can be effected within the spirit and scope of the invention as described hereinabove, and as defined in the appended claims.

What we claim is:

1. In a process for selectively oxidizing the leucoanthraquinone nucleus of a leucoanthraquinone compound containing at least one substituent selected from the class consisting of ortho- and para-dihydroxyphenyl groups, said dihydroxyphenyl substituent being joined to the leucoanthraquinone nucleus through an alkylamino group present on said nucleus, to form the corresponding anthraquinone dye without oxidizing said dihydroxyphenyl substituent, the step of heating said leucoanthraquinone compound at a temperature of about 100° C. to 112° C. in the presence of an inert solvent, of an o- or p-benzoquinone compound in an amount equal to about 5 to 20% of the weight of said leucoanthraquinone compound, and activated carbon under acid conditions.

2. In a process for preparing 1,4-bis(α-methyl-β-hydroquinonylethylamino)-5,8-dihydroxyanthraquinone, the step of heating leuco 1,4-bis(α-methyl-β-hydroquinonylethylamino)-5,8-dihydroxyanthraquinone at a temperature of about 100° C. to 112° C. in the presence of an inert solvent, p-benzoquinone in an amount equal to 5 to 20% of the weight of said leucoanthraquinone compound, and activated carbon under acid conditions.

3. The process defined in claim 1 wherein the benzoquinone compound is p-benzoquinone.

References Cited

UNITED STATES PATENTS 3,253,002   5/1966   Jandrue et al. _____ 260—380

OTHER REFERENCES

Fieser et al.: Organic Chemistry, Boston, D. C. Heath and Co., pp. 726–731 (1944).

LORRAINE A. WEINBERGER, *Primary Examiner.*

H. C. WEGNER, *Assistant Examiner.*